(12) United States Patent
Wu et al.

(10) Patent No.: US 11,091,579 B2
(45) Date of Patent: Aug. 17, 2021

(54) AQUEOUS DISPERSIONS INCLUDING POLYESTER PARTICLES, PHOTOPOLYMERIZABLE COMPOSITIONS, ARTICLES, AND METHODS

(71) Applicant: 3M INNOVATIVE PROPERTIES COMPANY, St. Paul, MN (US)

(72) Inventors: Tianyu Wu, St. Paul, MN (US); Ying-Yuh Lu, Woodbury, MN (US); Lin Chen, St. Paul, MN (US); Jung-Sheng Wu, Woodbury, MN (US); Ahmed S. Abuelyaman, Woodbury, MN (US); James D. Hansen, White Bear Lake, MN (US); Tianying Jiang, Falcon Heights, MN (US); Erick I. Soto Cantu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/047,409

(22) PCT Filed: Jun. 17, 2019

(86) PCT No.: PCT/IB2019/055054
§ 371 (c)(1),
(2) Date: Oct. 14, 2020

(87) PCT Pub. No.: WO2019/244007
PCT Pub. Date: Dec. 26, 2019

(65) Prior Publication Data
US 2021/0108019 A1 Apr. 15, 2021

Related U.S. Application Data (60) Provisional application No. 62/686,745, filed on Jun. 19, 2018.

(51) Int. Cl.
| | |
|---|---|
| *C08F 299/02* | (2006.01) |
| *C09D 7/45* | (2018.01) |
| *C08J 3/07* | (2006.01) |
| *C09D 5/02* | (2006.01) |
| *C09D 167/02* | (2006.01) |

(52) U.S. Cl.
CPC ............. *C08F 299/024* (2013.01); *C08J 3/07* (2013.01); *C09D 5/027* (2013.01); *C09D 7/45* (2018.01); *C09D 167/02* (2013.01); *C08J 2367/02* (2013.01)

(58) Field of Classification Search
None
See application file for complete search history.

(56) References Cited

U.S. PATENT DOCUMENTS

| | | |
|---|---|---|
| 5,252,615 A | 10/1993 | Rao |
| 5,958,601 A | 9/1999 | Salsman |
| 6,521,679 B1 | 2/2003 | Okada |
| 6,716,911 B2 | 4/2004 | Doi |
| 7,022,760 B2 | 4/2006 | Melchiors |
| 7,408,001 B2 | 8/2008 | Melchiors |
| 7,439,276 B2 | 10/2008 | Strandburg |
| 9,205,601 B2 | 12/2015 | DeSimone |
| 9,360,757 B2 | 6/2016 | DeSimone |

(Continued)

FOREIGN PATENT DOCUMENTS

| | | |
|---|---|---|
| CA | 2791220 | 9/2011 |
| CN | 1315985 | 10/2001 |
| CN | 1656185 | 8/2005 |
| CN | 1726257 | 1/2006 |
| CN | 103613710 | 3/2014 |
| JP | H 04332756 | 11/1992 |
| JP | 1112333 | 1/1999 |
| JP | 2000336302 | 12/2000 |
| JP | 2001310944 | 11/2001 |
| JP | 2003292548 | 10/2003 |
| WO | WO 2009-045752 | 4/2009 |
| WO | WO 2015-094842 | 6/2015 |

(Continued)

OTHER PUBLICATIONS

Chen, "Poly(ethylene glycol-co-1,4-cyclohexanedimethanol terephthalate) random copolymers: effect of copolymer composition and microstructure on the thermal properties and crystallization behavior", RSC Advance, 2015, vol. 5, No. 74, pp. 60570-60580.
International Search Report for PCT International Application No. PCT/IB2019/055054, dated Nov. 12, 2019, 3 pages.

*Primary Examiner* — Christopher M Rodd
(74) *Attorney, Agent, or Firm* — Adrian L. Pishko (57) ABSTRACT

The present disclosure provides an aqueous dispersion. The aqueous dispersion includes a) water; b) a surfactant having at least one ethylenically unsaturated group; and c) polyester particles dispersed in the water. The polyester particles include a water-insoluble polyester having a weight average molecular weight of 20 kiloDaltons or greater, and the polyester particles have an average diameter that is submicron in size. Further, the present disclosure provides a method of making the aqueous dispersion. The method includes a) dissolving a water-insoluble polyester in a water-immiscible solvent to form a polyester solution; b) combining the polyester solution with an aqueous solution including water and a surfactant; and c) removing at least a portion of the water-immiscible solvent to form the aqueous dispersion including polyester particles dispersed in the water. The present disclosure also provides a photopolymerizable composition including a) water; b) a surfactant; c) polyester particles dispersed in the water; d) a photoinitiator; e) at least one ethylenically unsaturated monomer dispersed in the water; and f) an optional polymerization inhibitor. The present disclosure also provides coatings and articles prepared from the aqueous dispersion or photopolymerizable composition.

20 Claims, 1 Drawing Sheet

(56) References Cited

U.S. PATENT DOCUMENTS

| | | | |
|---|---|---|---|
| 2003/0181630 A1* | 9/2003 | Doi | C08J 3/03 |
| | | | 528/272 |
| 2005/0038178 A1* | 2/2005 | Von Schmittou | D06M 15/263 |
| | | | 524/556 |
| 2006/0069231 A1 | 3/2006 | Kajimaru | |
| 2007/0031791 A1 | 2/2007 | Cinader, Jr. | |
| 2008/0038646 A1* | 2/2008 | Mera | G03G 9/0806 |
| | | | 430/48 |
| 2008/0248442 A1 | 10/2008 | Raby | |
| 2011/0091832 A1 | 4/2011 | Kim | |
| 2013/0095446 A1 | 4/2013 | Andreiko | |
| 2014/0239527 A1 | 8/2014 | Lee | |
| 2014/0356799 A1 | 12/2014 | Cinader, Jr. | |
| 2019/0374309 A1 | 12/2019 | Parkar | |
| 2020/0140614 A1 | 5/2020 | Parkar | |

FOREIGN PATENT DOCUMENTS

| | | |
|---|---|---|
| WO | WO 2016-109660 | 7/2016 |
| WO | WO 2016-148960 | 9/2016 |
| WO | WO 2016-149007 | 9/2016 |
| WO | WO 2017-127561 | 7/2017 |
| WO | WO 2017-127569 | 7/2017 |
| WO | WO 2017-127572 | 7/2017 |
| WO | WO 2018-005501 | 1/2018 |
| WO | WO 2018-031403 | 2/2018 |
| WO | WO 2018-119026 | 6/2018 |
| WO | WO 2019-103855 | 5/2019 |
| WO | WO 2019-175716 | 9/2019 |

* cited by examiner

AQUEOUS DISPERSIONS INCLUDING POLYESTER PARTICLES, PHOTOPOLYMERIZABLE COMPOSITIONS, ARTICLES, AND METHODS

CROSS REFERENCE TO RELATED APPLICATIONS

This application is a national stage filing under 35 U.S.C. 371 of PCT/IB2019/055054, filed Jun. 17, 2019, which claims the benefit of U.S. Application No. 62/686,745, filed Jun. 19, 2018, the disclosure of which is incorporated by reference in its/their entirety herein.

TECHNICAL FIELD

The present disclosure broadly relates to aqueous dispersions containing water-insoluble polyester particles and methods of making the dispersions.

BACKGROUND

Aqueous dispersions of water-insoluble polyesters have been made for industries such as painting, coating, and textiles. There remains a need, however, for additional aqueous dispersions of polyester particles and compositions containing dispersed polyester particles.

SUMMARY

Aqueous dispersions and photopolymerizable compositions containing dispersed polyester particles are provided.

In a first aspect, an aqueous dispersion is provided. The aqueous dispersion includes a) water; b) a surfactant; and c) polyester particles dispersed in the water. The surfactant has at least one ethylenically unsaturated group. The polyester particles include a water-insoluble polyester having a weight average molecular weight of 20 kiloDaltons (kD) or greater, and the polyester particles have an average diameter that is submicron in size.

In a second aspect, a photopolymerizable composition is provided. The photopolymerizable composition includes a) water; b) a surfactant; c) polyester particles dispersed in the water; d) a photoinitiator; e) at least one ethylenically unsaturated monomer dispersed in the water; and f) an optional polymerization inhibitor. The surfactant has at least one ethylenically unsaturated group. The polyester particles include a water-insoluble polyester having a weight average molecular weight of 20 kiloDaltons or greater, and the polyester particles have an average diameter that is submicron in size. Optionally, the photopolymerizable composition also includes an optical brightener.

In a third aspect, a method of making an aqueous dispersion is provided. The method includes a) dissolving a water-insoluble polyester in a water-immiscible solvent to form a polyester solution; b) combining the polyester solution with an aqueous solution including water and a surfactant under high shear; and c) removing at least a portion of the water-immiscible solvent to form the aqueous dispersion including polyester particles dispersed in the water. The surfactant has at least one ethylenically unsaturated group. The water-insoluble polyester has a weight average molecular weight of 20 kD or greater.

In a fourth aspect, a coating is provided. The coating includes a dried layer of the aqueous dispersion of the first aspect.

In a fifth aspect, another coating is provided. The coating includes a polymerization product of the aqueous dispersion of the first aspect.

In a sixth aspect, an article is provided. The article includes a substrate and a polymerization product of the aqueous dispersion of the first aspect disposed on at least a portion of the substrate.

In a seventh aspect, another article is provided. The article includes a polymerized reaction product of the photopolymerizable composition of the second aspect.

Aqueous dispersions according to at least certain embodiments of this disclosure were found to be stable at relatively high solids loadings (e.g., 40 weight percent or higher). Further, coatings and articles made using compositions containing polyester particles according to at least certain embodiments of this disclosure were found to be polymerizable and/or photopolymerizable. Still further, cured coatings and articles made using aqueous dispersions or photopolymerizable compositions containing polyester particles according to at least certain embodiments of this disclosure, where the surfactant polymerizes with the ethylenically unsaturated monomer(s), were expected to have less extractable material(s) when exposed to aqueous media than those prepared with non-polymerizable surfactants.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
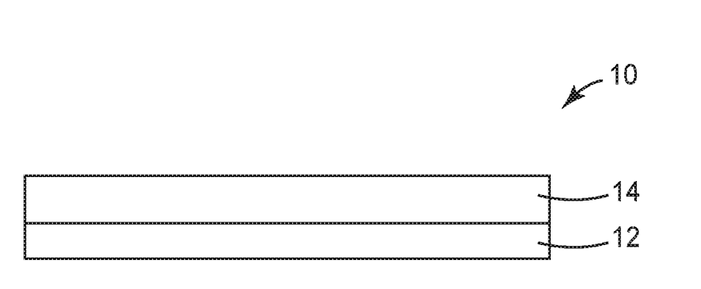
The FIGURE is an exemplary schematic cross-sectional view of an article including a substrate and a polymerization product of an aqueous dispersion or photopolymerization composition disposed thereon.

While the above-identified FIGURE sets forth embodiments of the disclosure, other embodiments are also contemplated, as noted in the description. The FIGURE is not necessarily drawn to scale. In all cases, this disclosure presents aspects of the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

As used herein, "aqueous" means containing at least 5 percent by weight of water.

As used herein, "aliphatic group" means a saturated or unsaturated linear, branched, or cyclic hydrocarbon group. This term is used to encompass alkyl, alkenyl, and alkynyl groups, for example.

As used herein, "alkyl" means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, "alkylene" means a linear saturated divalent hydrocarbon having from one to twelve carbon atoms or a branched saturated divalent hydrocarbon radical having from three to twelve carbon atoms, e.g., methylene, ethylene, propylene, 2-methylpropylene, pentylene, hexylene, and the like.

As used herein, "alkenyl" refers to a monovalent linear or branched unsaturated aliphatic group with one or more carbon-carbon double bonds, e.g., vinyl. Unless otherwise indicated, the alkenyl groups typically contain from one to twenty carbon atoms.

As used herein, "alkenediyl" refers to a straight-chained, branched, or cyclic divalent unsaturated aliphatic group, e.g., —CH=CH—, —CH=C(CH$_3$)CH$_2$—, —CH=CHCH$_2$—, and the like.

Unless otherwise indicated, the alkenediyl groups typically contain from one to twenty carbon atoms.

As used herein, "heteroalkyl" refers to a straight-chained, branched, or cyclic alkyl group with one or more heteroatoms independently selected from N, O, and S, preferably N or O, including both unsubstituted and substituted alkyl groups. Unless otherwise indicated, the heteroalkyl groups typically contain from one to twenty carbon atoms and one or more N, O, or S atoms. Examples of "heteroalkyl" as used herein include, but are not limited to, methoxy, ethoxy, propoxy, 3,6-dioxaheptyl, 4-dimethylaminobutyl, and the like. Unless otherwise noted, heteroalkyl groups may be mono- or polyvalent, i.e. monovalent heteroalkyl or polyvalent heteroalkylene. "Heteroalkenyl" refers to a monovalent linear or branched unsaturated aliphatic group with one or more carbon-carbon double bonds including one or more heteroatoms independently selected from N, O, and S, preferably N or O, with both unsubstituted and substituted aliphatic groups. "Heteroalkenediyl" refers to a straight-chained, branched, or cyclic divalent unsaturated aliphatic group including one or more heteroatoms independently selected from N, O, and S, preferably N or O, including both unsubstituted and substituted aliphatic groups.

As used herein, the terms "hardenable" refers to a material that can be cured or solidified, e.g., by heating to remove solvent, heating to cause polymerization, chemical crosslinking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth)acrylate-functional compounds" are compounds that include, among other things, a (meth)acrylate moiety.

As used herein, the term "ethylenically unsaturated" refers to a double bond between two carbon atoms, and includes functional groups such as vinyl (H$_2$C=CH—), including vinyl ethers (H$_2$C=CHO—), vinyl esters (H$_2$C=CHOCO—), styrene (e.g., vinylbenzene) and alkenyl (H$_2$C=CH(CH$_2$)$_n$— wherein n typically ranges from 1 to 30 or 1 to 20 or 1 to 10. Ethylenically unsaturated groups also include (meth)acryl such as (meth)acrylamide (H$_2$C=CHCONH— and H$_2$C=CH(CH$_3$)CONH—) and (meth)acrylate(CH$_2$=CHCOO— and CH$_2$=C(CH$_3$)COO—).

As used herein, "monomer" refers to a molecule that can be bonded to one or more identical or different molecules to form an oligomer or polymer.

As used herein, "oligomer" refers to a molecule that has one or more properties that change upon the addition of a single further repeat unit.

As used herein, "polymer" refers to a molecule having one or more properties that do not change upon the addition of a single further repeat unit.

As used herein, "polymerizable composition" means a hardenable composition that can undergo polymerization upon initiation (e.g., free-radical polymerization initiation). In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used.

As used herein, "polymerizable components" encompasses all monomers, oligomers, polymers, and surfactants having ethylenically unsaturated group(s) that may be present in a hardenable composition. Often, a polymerizable composition contains a mixture of more than one polymerizable component.

As used herein, "surfactant", means and includes a substance or compound that reduces surface tension when dissolved in water or water solutions, or that reduces interfacial tension between two liquids, or between a liquid and a solid. The surfactant typically includes both a hydrophilic (polar) group and a hydrophobic/lipophilic (non-polar) group. The surfactant is either cationic, anionic, or non-ionic with a hydrophilic-lipophilic balance (HLB) of greater than 10 (preferably in the range of 12-16). HLB can be determined using Griffin's Mathematical Method, in which HLB=20×($M_h$/M), where $M_h$=molecular weight of hydrophilic groups and M=molecular weight of the total molecule.

As used herein, "theoretical density" refers to the highest achievable density of a material that contains no pores or other voids and also contains no other materials. Theoretical density can be calculated using cell volume and cell mass of the material, as known in the art.

The term "glass transition temperature" or "$T_g$" refers to the temperature at which a material changes from a glassy state to a rubbery state. In this context, the term "glassy" means that the material is hard and brittle (and therefore relatively easy to break) while the term "rubbery" means that the material is elastic and flexible. For polymeric materials, the $T_g$ is the critical temperature that separates their glassy and rubbery behaviors. If a polymeric material is at a temperature below its $T_g$, large-scale molecular motion is severely restricted because the material is essentially frozen. On the other hand, if the polymeric material is at a temperature above its $T_g$, molecular motion on the scale of its repeat unit takes place, allowing it to be soft or rubbery. Any reference herein to the $T_g$ of a monomer refers to the $T_g$ of a homopolymer formed from that monomer. The glass transition temperature of a polymeric material is often determined using methods such as Differential Scanning calorimetry (e.g., Modulated Differential Scanning calorimetry). Alternatively, the glass transition of a polymeric material can be calculated using the Fox Equation if the amount and $T_g$ of each monomer used to form the polymeric material are known.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

In a first aspect, an aqueous dispersion is provided. The aqueous dispersion comprises:
a) water;
b) a surfactant, wherein the surfactant comprises at least one ethylenically unsaturated group; and
c) polyester particles dispersed in the water, wherein the polyester particles comprise a water-insoluble polyester having a weight average molecular weight of 20 kiloDaltons (kD) or greater, and wherein the polyester particles have an average diameter that is submicron in size.

In a second aspect, a photopolymerizable composition is provided. The photopolymerizable composition comprises:
a) water;
b) a surfactant;
c) polyester particles dispersed in the water, wherein the polyester particles comprise a water-insoluble polyester having a weight average molecular weight of 20 kD or greater and wherein the polyester particles have an average diameter that is submicron in size;
d) a photoinitiator;
e) at least one ethylenically unsaturated monomer dispersed in the water; and
f) an optional polymerization inhibitor.

Each of the aqueous dispersion and the photopolymerizable composition may contain up to 70 weight percent (wt. %) solids, based on the total weight of the aqueous dispersion or the photopolymerizable composition, respectively. As used herein, the term "solids" refers to every component other than the water. Optionally the aqueous dispersion or the photopolymerizable composition comprises a solids content of 5 wt. % or greater, 10 wt. % or greater, 15 wt. % or greater, 20 wt. % or greater, 25 wt. % or greater, 30 wt. % or greater, 35 wt. % or greater, or 40 wt. % or greater; and 70 wt. % or less, 60 wt. % or less, 55 wt. % or less, 50 wt. % or less, or 45 wt. % or less, based on the total weight of the aqueous dispersion or the photopolymerizable composition. Stated another way, the solids content may be 5 to 70 wt. %, 15 to 70 wt. %, 25 to 70 wt. %, 40 to 70 wt. %, or 25 to 45 wt. %, based on the total weight of the aqueous dispersion. Advantageously, such dispersions and compositions still have low viscosities at high solids loadings (e.g., 40 wt. % or greater).

The components (a) through (f) of the first aspect and the second aspect are discussed in detail below.

Water

The aqueous dispersions and photopolymerizable compositions of the present disclosure include water. Suitable water includes any of distilled water, purified water, and/or deionized water, obtainable using a commercially available water treatment system. Typically, the water is present in an amount of 10 wt. % or greater, 15 wt. % or greater, 20 wt. % or greater, 25 wt. % or greater, 30 wt. % or greater, 35 wt. % or greater, 40 wt. % or greater, 45 wt. % or greater, 50 wt. % or greater, 55 wt. % or greater, or 60 wt. % or greater, based on the total weight of the aqueous dispersion or the photopolymerizable composition; and 85 wt. % or less, 80 wt. % or less, 75 wt. % or less, 70 wt. % or less, or 65 wt. % or less, based on the total weight of the aqueous dispersion or the photopolymerizable composition. Stated another way, the water may be present in an amount of 10 to 85 wt. % or 60 to 85 wt. %, inclusive, based on the total weight of the aqueous dispersion or the photopolymerizable composition.

Surfactant

The aqueous dispersions and the photopolymerizable compositions of the present disclosure include at least one surfactant. As noted above, a surfactant reduces surface tension when dissolved in water or water solutions, or reduces interfacial tension between two liquids, or between a liquid and a solid. Surfactants generally contain both a hydrophilic (polar) group and a hydrophobic (non-polar) group. In many embodiments, the surfactants of the present disclosure comprise at least one ethylenically unsaturated group, which allows the surfactants to be polymerizable. In certain embodiments, the at least one ethylenically unsaturated group comprises one or more of a (meth)acrylate group, a styrene group, a vinyl ether group, or a vinyl ester group. The polymerizable surfactant may be copolymerized with ethylenically unsaturated monomers, resulting in reduced extractable in cured parts, while non-polymerizable surfactant would likely migrate to the surfaces and become leachable.

Examples of useful surfactants include anionic surfactants, cationic surfactants, and non-ionic surfactants.

Example polymerizable surfactants include polyoxyethylene styrenated phenyl ether ammonium sulfate compounds such as those commercially available from Dai-ichi

Kogyo Seiyaku (Kyoto, Japan) under the trade designation HITENOL AR (e.g., HITENOL AR-10, AR-1025, AR-20, and AR-2020), which have a structure shown below where n is at least 2 and where m is an integer such as one close to or equal to 20.

Example polymerizable surfactants include propenyl polyoxyethylene alkylphenyl compounds such as those commercially available from Montello, Inc. (Tulsa, Okla., USA) under the trade designation NOIGEN RN (e.g., RN-10, RN-20, RN-30, RN-40, and RN-5065), which have a structure shown below where n is at least 2 and where x is an integer such as one close to or equal to 9.

Other

Another example polymerizable surfactant is sodium dodecylallyl sulfosuccinate, $CH_3—(CH_2)_{11}—O—(CO)—CH_2—CH(SO_3Na)—(CO)—O—CH_2—CH=CH_2$. Yet other examples of polymerizable surfactants are phosphate esters such as those commercially available from Croda (Edison, N.Y., USA) under the trade designation MAXENUL (e.g., MAXEMUL 6106 and 6112). An additional polymerizable surfactant is commercially available from Lubrizol under the trade designation SOLSPERSE X300. SOLSPERSE X300 is disclosed to be a 100% active cross-linkable dispersant that can be dissolved into oligomer/monomer before the addition of pigments.

The surfactant is often included in the aqueous dispersion or in the photopolymerizable composition in an amount of 1 to 20 wt. %, inclusive, based on the total weight of the polyester particles, such as 1 to 9 wt. %, inclusive, or 10 to 20 wt. %, inclusive. Typically, the surfactant is included in the aqueous dispersion or in the photopolymerizable composition in an amount of 1 wt. % or more, 2 wt. % or more, 3 wt. % or more, 4 wt. % or more, 5 wt. % or more, 6 wt. % or more, 7 wt. % or more, 8 wt. % or more, 10 wt. % or more, 12 wt. % or more, or 14 wt. % or more; and 20 wt. % or less, 17 wt. % or less, 15 wt. % or less, 13 wt. % or less, 11 wt. % or less, or 9 wt. % or less, based on the total weight of the polyester particles.

Polyester Particles

The aqueous dispersions and the photopolymerizable compositions of the present disclosure include a plurality of polyester particles. A polyester is prepared by reactions of one or more different carboxylate monomers (e.g., compounds with two or more carboxylic acid or ester functional groups) with one or more different glycol monomers (e.g., compounds with two or more hydroxyl functional groups). The properties of a polyester polymer or film vary with the particular choice of kind and amount of monomer molecules. The term "polyester polymer" refers to any polymer wherein the repeat units are joined by ester linkages. In some embodiments, the polyester polymer is a homopolymer (i.e., homopolyester) derived from a single carboxylate monomer and a single glycol monomer. In other embodiments, the polyester polymer is a copolymer (i.e., copolyester) derived from at least two different carboxylate monomers and a single glycol monomer, at least two different glycol monomers and a single carboxylate monomer, or a combination of two or more different carboxylate monomers and two or more different glycol monomers. In some embodiments, the polyester polymer is at least one of an aliphatic (co)polyester or an aliphatic-aromatic copolyester. The aliphatic (co)polyester may be either an aliphatic homopolyester or an aliphatic copolyester.

As noted above, the term "aliphatic" refers to a saturated or unsaturated linear, branched, or cyclic hydrocarbon group. The aliphatic portion of a (co)polyester may be provided by one or more alkane diols, such as ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, ethylene glycol, 1,3-propanediol, 1,4-butanediol, 2,2-dimethyl-1,3-propanediol (neopentyl glycol), cyclopentanediol, 1,4-cyclohexanediol, 1,2-cyclohexanedimethanol, 1,3-cyclohexanedimethanol, 1,4-cyclohexanedimethanol, 2,2,4,4-tetramethyl-1,3-cyclobutanediol and combinations thereof. The aliphatic portion of a (co)polyester may be provided by one or more aliphatic dicarboxylic acids, such as malonic acid, succinic acid, glutaric acid, 2-methylglutaric acid, 3-methylglutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, 2,5-norbornanedicarboxylic acid, and combinations thereof. The mole ratio of the alkane diols to aliphatic dicarboxylic acids is close to 1:1.

Suitable aliphatic (co)polyesters include for instance and without limitation, poly(butylene adipate) and poly(butylene succinate).

Aliphatic-aromatic copolyesters comprise at least one aliphatic monomer and at least one aromatic monomer. Example aliphatic monomers are as described above with respect to aliphatic (co)polyesters. Suitable aromatic diols include for instance and without limitation, resorcinol, pyrocatechol, bisphenol A, and bis(2-hydroxyethyl) phthalate; aromatic triols such as pyrogallol, phloroglucinol, and 2-phenyl-2,2-methylolethanol. Suitable aromatic dicarboxylic acids include for instance and without limitation, terephthalic acid, isophthalic acid, 2,6-naphthoic acid, 1,5-naphthoic acid, or their ester-forming derivatives. For instance, the aromatic component may preferably be selected from the group consisting of terephthalate, isophthalate, orthophthalate and napthalate.

Suitable aliphatic-aromatic copolyesters include for instance and without limitation, glycol-modified polyethylene terephthalate (PETg), in which cyclohexyldimethanol is included during the polymerization of terephthalic acid and ethylene glycol, resulting in a more amorphous structure than PET. In an embodiment, the ethylene glycol and cyclohexyldimethanol are present in the copolyester in a weight ratio range of 70/30 to 10/90 of ethylene glycol to cyclohexyldimethanol. Another polyester polymer may contain carboxylate subunits derived from cyclohexane dicarboxylate, such as dimethyl cyclohexane dicarboxylate and dimethyl tertiary-butyl isophthalate, and glycol subunits derived from C2-C4 diols and trimethylol propane.

Copolymers or polymers can be formed in a miscible blend of the selected monomers by, for example, coextrusion or reaction, including transesterification, for example. An acid or base or Ti catalyst is typically added, and the reaction is performed at elevated temperature, such as 150° C. to 275° C.

Suitable polyester polymers for use in the present disclosure may have a number average molecular weight of 5 kD or greater, 7 kD or greater, 10 kD or greater, 15 kD or greater, 20 kD or greater, 25 kD or greater, 30 kD or greater, 35 kD or greater, 40 kD or greater, 45 kD or greater, or 50 kD or greater; and 1,000 kD or less, 900 kD or less, 800 kD or less, 700 kD or less, 600 kD or less, 500 kD or less, 400 kD or less, 300 kD or less, 200 kD or less, 100 kD or less, or 75 kD or less. Stated another way, polyester polymers for use in the present disclosure may have a number average molecular weight of 5 kD to 1,000 kD, 5 kD to 500 kD, or 50 kD to 1,000 kD. Similarly, suitable polyester polymers have a weight average molecular weight of 20 kD or greater, 30 kD or greater, 40 kD or greater, 50 kD or greater, 60 kD or greater, 70 kD or greater, 80 kD or greater, 90 kD or greater, 100 kD or greater, 125 kD or greater, 150 kD or greater, 200 kD or greater, 300 kD or greater, 400 kD or greater, or 500 kD or greater; and 5,000 kD or less, 4,000 kD or less, 3,000 kD or less, 2,000 kD or less, 1,000 kD or less, 900 kD or less, 800 kD or less, 700 kD or less, or 600 kD or less. Stated another way, polyester polymers for use in the present disclosure may have a weight average molecular weight of 20 kD to 5,000 kD or 50 kD to 1,000 kD. The number average and weight average molecular weight can each be determined using gel permeation chromatography (GPC).

Polyester polymers according to the present disclosure are water-insoluble. The insolubility can be determined by the acid number of the polyester polymer. Acid number is defined as the mass of potassium hydroxide (KOH) in units of milligrams (mg) needed to neutralize one gram of the polyester polymer. If the acid number is too high, e.g., over 10 mg KOH per gram of the polyester polymer, the polyester polymer will be sufficiently polar to have water dispersibility of more than 50 grams per 100 cubic centimeters (cc) of water at 25° C. while maintaining average particle sizes <100 nm in the absence of surfactants. The acid number can be determined by titrating a solution of the polyester polymer in an organic solvent with a KOH solution. In any embodiment, the polyester particles comprise an acid number of less than 10 mg KOH per gram (g) of the polyester particles, 9 mg KOH or less, 8 mg KOH or less, 7 mg KOH or less, 6 mg KOH or less, 5 mg KOH or less, 4 mg KOH or less, 3 mg KOH or less, 2 mg KOH or less, or 1 mg KOH or less, per g of the polyester particles. Stated another way, the polyester particles comprise an acid number of 0.5 mg KOH to 5 mg KOH, per gram of the polyester particles, or 1 mg KOH to 9 mg KOH, per gram of the polyester particles. For instance, PACUR PET-G (Pacur, LLC, Oshkosh, Wis.) has an acid number of 0.70 mg KOH per g of the polymer.

The polyester particles have an average diameter that is submicron. In some embodiments, the polyester particles have an average diameter that is 200 nanometers (nm) or greater, 250 nm or greater, 300 nm or greater, 350 nm or greater, or 400 nm or greater; and less than 1 micrometer, 950 nm or less, 900 nm or less, 850 nm or less, 800 nm or less, 750 nm or less, 700 nm or less, 650 nm or less, 600 nm or less, 550 nm or less, 500 nm or less, or 450 nm or less. Stated another way, the polyester particles may have an average diameter ranging from 200 nm to 900 nm, 200 nm to 700 nm, or 200 nm to 450 nm, inclusive. The particle size of the polyester particles depends on the particular conditions of the preparation of an aqueous dispersion from a polyester solution (e.g., polyester solution viscosity, or mixing efficiency). Methods for making an aqueous dispersion are described below. The average particle sizes can be measured using, for instance, dynamic light scattering. Specifically, samples can be diluted with 0.2 micron filtered DI water to 0.002% concentration and analyzed using a Malvern ZetaSizer Nano ZS instrument with the instrument setting of Material R.I. 1.500; Dispersant ($H_2O$) R.I. 1.330; Viscosity 0.8872 cP at 25° C.

The polyester particles are often included in the aqueous dispersion or in the photopolymerizable composition in an amount of 15 to 45 wt. %, inclusive, based on the total weight of the aqueous dispersion or the photopolymerizable composition, such as 20 to 40 wt. %, inclusive, or 25 to 45 wt. %, inclusive. Typically, the polyester particles are included in the aqueous dispersion or in the photopolymerizable composition in an amount of 15 wt. % or more, 16 wt. % or more, 17 wt. % or more, 18 wt. % or more, 19 wt. % or more, 20 wt. % or more, 21 wt. % or more, 22 wt. % or more, 23 wt. % or more, 24 wt. % or more, or 25 wt. % or more; and 45 wt. % or less, 43 wt. % or less, 42 wt. % or less, 40 wt. % or less, 38 wt. % or less, 36 wt. % or less, 34 wt. % or less, 32 wt. % or less, 30 wt. % or less, 28 wt. % or less, or 26 wt. % or less, based on the total weight of the polyester particles.

Photoinitiator

Photopolymerizable compositions of the present disclosure include at least one photoinitiator, and aqueous dispersions of the present disclosure optionally include at least one photoinitiator. Suitable exemplary photoinitiators are those available under the trade designations OMNIRAD from IGM Resins (Waalwijk, The Netherlands) and include 1-hydroxycyclohexyl phenyl ketone (OMNIRAD 184), 2,2-dimethoxy-1,2-diphenylethan-1-one (OMNIRAD 651), bis(2, 4,6 trimethylbenzoyl)phenylphosphineoxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl)butanone (OMNIRAD 369), 2-methyl-1-[4-(methylthio)phenyl]-2-morpholinopropan-1-one (OMNIRAD 907), Oligo[2-hydroxy-2-methyl-1-[4-(1-methylvinyl)phenyl]propanone] ESACURE ONE (Lamberti S.p.A., Gallarate, Italy), 2-hydroxy-2-methyl-1-phenyl propan-1-one (DAROCUR 1173), 2,4,6-trimethylbenzoyldiphenylphosphine oxide (OMNIRAD TPO), and 2,4,6-trimethylbenzoylphenyl phosphinate (OMNIRAD TPO-L). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof.

In some embodiments, a photoinitiator is present in a photopolymerizable composition in an amount of up to about 5% by weight, based on the total weight of polymerizable components in the photopolymerizable composition or aqueous dispersion. In some cases, a photoinitiator is present in an amount of about 0.1-5% by weight, based on the total weight of polymerizable components in the photopolymerizable composition or aqueous dispersion.

A thermal initiator can be present in a photopolymerizable composition or an aqueous dispersion described herein. In some embodiments, a thermal initiator is present in a photopolymerizable composition or in an aqueous dispersion in an amount of up to about 5% by weight, based on the total weight of polymerizable components in the photopolymerizable composition or aqueous dispersion. In some cases, a thermal initiator is present in an amount of about 0.1-5% by weight, based on the total weight of polymerizable components in the photopolymerizable composition or aqueous dispersion. Suitable thermal initiators include for instance and without limitation, peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO 67 (2,2'-azo-bis (2-methybutyronitrile)) VAZO 64 (2,2'-azo-bis(isobutyronitrile)) and VAZO 52 (2,2'-azo-bis(2,2-dimethyvaleronitrile)), and LUCIDOL 70 from Elf Atochem North America, Philadelphia, Pa.

In certain aspects, the use of more than one initiator assists in increasing the percentage of monomer that gets incorporated into the reaction product of polymerizable components and thus decreasing the percentage of the monomer that remains uncured.

Monomer

The aqueous dispersions and/or the photopolymerizable compositions of the present disclosure optionally include at least one monomer dispersed in the aqueous dispersion or dispersed or dissolved in the photopolymerizable composition, respectively. A "monomer," for reference purposes herein, is a component that contains at least one free radically reactive group (e.g., an ethylenically-unsaturated group) that can co-react with the at least one surfactant (e.g., is capable of undergoing addition polymerization). Often, the at least one ethylenically unsaturated monomer comprises a multifunctional monomer. The at least one ethylenically unsaturated monomer is preferably water soluble or water dispersible.

In some embodiments, the monomer comprises a (meth) acrylate, a vinyl ether, a vinyl ester, a styrene, or combinations thereof.

Suitable free-radically polymerizable ethylenically unsaturated (meth)acrylate monomers include di-, tri-, or other poly-acrylates and methacrylates such as glycerol diacrylate, tetraethylene glycol dimethacrylate (TEGDMA), ethyleneglycol diacrylate, diethyleneglycol diacrylate, triethyleneglycol dimethacrylate, and the bis-acrylates and bis-methacrylates of polyethylene glycols of molecular weight 200-500.

Poly(meth)acrylates, are also suitable, for example, di-, tri-, tetra- or pentafunctional monomeric or oligomeric aliphatic, cycloaliphatic or aromatic acrylates or methacrylates. Examples of suitable aliphatic poly(meth)acrylates having more than two (meth)acrylate groups in their molecules are the hydroxyl-containing tri(meth)acrylates which are obtained by reacting triepoxide compounds, for example the triglycidyl ethers of said triols, with (meth)acrylic acid. In some embodiments, ethoxylated or propoxylated 1,1,1-trimethylolpropanetriacrylate or methacrylate, ethoxylated or propoxylated glycerol triacrylate, are suitable.

In some cases, an ethylenically unsaturated monomer comprises vinyl ether monomers and/or vinyl esters of aliphatic, cycloaliphatic diols, including diethylene glycol, triethylene glycol, tetraethylene glycol, polyethylene glycol, ethoxylated neopentyl glycol. Suitable vinyl ether monomers include for instance and without limitation, di(ethylene glycol) divinyl ether and di(ethylene glycol) vinyl ether. Both of the above-mentioned vinyl ether monomers are commercially available from Sigma Aldrich (St. Louis, Mo.).

Suitable vinyl ester monomers include for instance and without limitation, vinyl acetate, vinyl propionate, vinyl butyrate, and divinyl esters of oligomeric polyesters comprising poly(ethylene glycol) of molecular weight 200-500 and aliphatic diacids with acid terminal groups.

Suitable vinyl styrenic monomers include for instance and without limitation, PEGylated styrene, and difunctional 4-vinylphenyl ethers of poly(ethylene glycol) of molecular weight 200-500 and aliphatic diacids with acid terminal groups.

In certain embodiments, the aqueous dispersion or the photopolymerizable composition is comprised primarily of multifunctional components, e.g., less than 10%, preferably less than 5%, preferably less than 2% of monofunctional monomers. An advantage of such compositions is that they tend to contain a minimal amount of unreacted monomer that is capable of leaching out of an article following cure.

The ethylenically unsaturated monomer, when present, is included in the aqueous dispersion or photopolymerizable composition in an amount of 10 to 200 wt. %, inclusive, based on the total weight of the polyester particles, such as 15 to 180 wt. %, inclusive. The ethylenically unsaturated monomer can be included in the aqueous dispersion or photopolymerizable composition in an amount of 10 wt. % or greater, 15 wt. % or greater, 20 wt. % or greater, 30 wt. % or greater, 40 wt. % or greater, 50 wt. % or greater, 70 wt. % or greater, 100 wt. % or greater, or 150 wt. % or greater; and 200 wt. % or less, 180 wt. % or less, 175 wt. % or less, 150 wt. % or less, 125 wt. % or less, 100 wt. % or less, 80 wt. % or less, 75 wt. % or less, 65 wt. % or less, 55 wt. % or less, 45 wt. % or less, 35 wt. % or less or 25 wt. % or less, based on the total weight of the polyester particles.

Additives

Aqueous dispersions or photopolymerizable compositions described herein, in some instances, further comprise one or more additives, such as one or more additives selected from the group consisting of inhibitors, stabilizing agents, sensitizers, absorption modifiers, fillers, and combinations thereof.

In addition, compositions described herein can further comprise one or more sensitizers to increase the effectiveness of one or more photoinitiators that may also be present. In some embodiments, a sensitizer comprises isopropylthioxanthone (ITX) or 2-chlorothioxanthone (CTX). Other sensitizers may also be used. If used, a sensitizer can be present in an amount ranging of about 0.01% by weight or about 1% by weight, based on the total weight of the polymerizable components in the aqueous dispersion or the photopolymerizable composition.

A photopolymerizable composition described herein optionally also comprises one or more polymerization inhibitors or stabilizing agents. A polymerization inhibitor is often included in a photopolymerizable composition to provide additional thermal stability to the composition. A stabilizing agent, in some instances, comprises one or more anti-oxidants. Any anti-oxidant not inconsistent with the objectives of the present disclosure may be used. In some embodiments, for example, suitable anti-oxidants include various aryl compounds, including butylated hydroxytoluene (BHT), which can also be used as a polymerization inhibitor in embodiments described herein. In addition to or as an alternative, a polymerization inhibitor comprises methoxyhydroquinone (MEHQ).

In some embodiments, a polymerization inhibitor, if used, is present in an amount of about 0.001-2% by weight, 0.001 to 1% by weight, or 0.01-1% by weight, based on the total weight of polymerizable components in the aqueous dispersion or in the photopolymerizable composition. Further, if used, a stabilizing agent is present in a photopolymerizable composition described herein in an amount of about 0.1-5% by weight, about 0.5-4% by weight, or about 1-3% by weight, based on the total weight of the photopolymerizable composition.

A photopolymerizable composition as described herein can also comprise one or more absorption modifiers (e.g., dyes, optical brighteners, pigments, particulate fillers, etc.) to control the penetration depth of actinic radiation. One particularly suitable absorption modifier is the optical brightener Tinopal OB, a benzoxazole, 2,2'-(2,5-thiophenediyl)bis[5-(1,1-dimethylethyl)], available from BASF Corporation, Florham Park, N.J. The absorption modifier, if used, can be present in an amount of about 0.001-5% by weight, about 0.01-1% by weight, about 0.1-3% by weight, or about 0.1-1% by weight, based on the total weight of the polymerizable components in the aqueous dispersion or in the photopolymerizable composition.

Photopolymerizable compositions may include fillers, including at least one filler having a submicron average particle size (e.g., nano-scale fillers). Examples of suitable fillers are naturally occurring or synthetic materials including, but not limited to: silica ($SiO_2$ (e.g., quartz)); alumina ($Al_2O_3$), calcite ($CaCO_3$), zirconia, nitrides (e.g., silicon nitride); glasses and fillers derived from, for example, Zr, Sr, Ce, Sb, Sn, Ba, Zn, and Al; feldspar; borosilicate glass; kaolin (china clay); talc; zirconia; titania; and submicron silica particles (e.g., pyrogenic silicas such as those available under the trade designations AEROSIL, including "OX 50," "130," "150" and "200" silicas from Degussa Corp., Akron, Ohio and CAB-O-SIL M5 and TS-720 silica from Cabot Corp., Tuscola, Ill.). Organic fillers made from polymeric materials are also possible, such as those disclosed in International Publication No. WO09/045752 (Kalgutkar et al.). In an embodiment, the filler comprises silica, calcite, or both.

If desired, the compositions of the disclosure may contain other additives such as indicators, accelerators, tackifiers, antioxidants, tartaric acid, chelating agents, buffering agents, and other similar ingredients that will be apparent to those skilled in the art.

Combinations of any of the above additives may also be employed. The selection and amount of any one such additive can be selected by one of skill in the art to accomplish the desired result without undue experimentation.

Methods

In a third aspect, the present disclosure provides a method of making an aqueous dispersion. The method comprises:

a) dissolving a water-insoluble polyester having a weight average molecular weight of 20 kD or greater in a water-immiscible solvent to form a polyester solution;

b) combining the polyester solution with an aqueous solution comprising water and a surfactant, wherein the surfactant comprises at least one ethylenically unsaturated group; and c) removing at least a portion of the water-immiscible solvent to form the aqueous dispersion comprising polyester particles dispersed in the water.

The water, water-insoluble polyester, and surfactant are as discussed in detail above.

The polyester solution and the aqueous solution may be mixed under "high shear" conditions, for instance mixing at a speed of 10,000 revolutions per minute (RPM) or greater with a stirrer, or 15,000 RPM or greater. Sonication may also be employed during preparation of an aqueous dispersion to effect mixing.

Typically, the water-immiscible solvent (e.g., chloroform) is removed using evaporation, such as under ambient and/or elevated temperature conditions. While it is typically preferable to remove all of the water-immiscible solvent, a small amount remaining in the composition (e.g., 10 wt. % or less, 5 wt. % or less, or 2 wt. % or less of the total solvent) is acceptable. Optionally, a portion of the water may be removed to increase the solids content of the aqueous dispersion.

Coatings and Articles

Advantageously, aqueous dispersions and photopolymerizable compositions according to at least certain embodiments of the present disclosure are useful for making coatings and/or articles.

In a fourth aspect, a coating is provided. The coating includes a dried layer of the aqueous dispersion of the first aspect.

In a fifth aspect, another coating is provided. The coating includes a polymerization product of the aqueous dispersion according to the first aspect.

In a sixth aspect, an article is provided. The article includes a substrate and a polymerization product of the aqueous dispersion according to the first aspect disposed on at least a portion of the substrate.

In a seventh aspect, another article is provided. The article includes a polymerized reaction product of the photopolymerizable composition according to the second aspect.

For instance, a coating may be prepared by forming a layer of the aqueous dispersion and then drying the layer (e.g., to remove the water and any remaining water-immiscible solvent from the layer). Useful coating methods include for instance and without limitation, dip coating, spin coating, spray coating, wiping, roll coating, brushing, spreading, flow coating, and combinations thereof. Drying may be performed at temperatures in a range from 20° C. to 140° C., and an oven with circulating air or inert gas such as nitrogen is often used for drying purposes.

In certain embodiments, a fluid layer of the aqueous dispersion is polymerized to form coating comprising a polymerization product of the aqueous dispersion. The surfactant and one or more optional monomer(s) may participate in the polymerization reaction. In some embodiments, an article may be prepared by forming a polymerized reaction product of the photopolymerizable composition of the second aspect. The initiation of polymerization is not particularly limited, and may include thermal initiation, photoinitiation, or a combination thereof. It was unexpectedly found that during polymerization, evaporation of water had to be minimized (e.g., less than 5%, less than 2%, or less than 1% of the total weight of the water could evaporate) for successful polymerization of the composition.

Referring to the FIGURE, a schematic cross-sectional view is provided of an article including a substrate and a polymerization product of an aqueous dispersion or photopolymerization composition disposed thereon. More particularly, the article 10 comprises a substrate 12 and a polymerization product 14 of an aqueous dispersion or a photopolymerizable composition disposed on at least a portion of the substrate 12.

The shape of the article is not limited, and may comprise a film or a shaped article. For instance, a film or article may readily be prepared by casting the aqueous dispersion or photopolymerizable composition according to the first or second aspect, respectively, then subjecting the cast composition to actinic radiation or heat to polymerize the aqueous dispersion or photopolymerizable composition.

An aqueous dispersion or photopolymerizable composition described herein in a cured state, in some embodiments, can exhibit one or more desired properties. An aqueous dispersion or photopolymerizable composition in a "cured" state can comprise a polymerizable component (e.g., surfactant or monomer) that has been at least partially polymerized and/or crosslinked. For instance, in some instances, a cured article is at least about 10% polymerized or crosslinked or at least about 30% polymerized or crosslinked. In some cases, a cured photopolymerizable composition is at least about 50%, at least about 70%, at least about 80%, or at least about 90% polymerized or crosslinked. A cured aqueous dispersion or photopolymerizable composition can also be between about 10% and about 99% polymerized or crosslinked.

More generally, the photopolymerizable composition is typically cured using actinic radiation, such as UV radiation, e-beam radiation, visible radiation, or any combination thereof. The skilled practitioner can select a suitable radiation source and range of wavelengths for a particular application without undue experimentation.

Select Embodiments of the Disclosure

Embodiment 1 is an aqueous dispersion. The aqueous dispersion includes a) water; b) a surfactant; and c) polyester particles dispersed in the water. The surfactant has at least one ethylenically unsaturated group. The polyester particles include a water-insoluble polyester having a weight average molecular weight of 20 kiloDaltons or greater, and the polyester particles have an average diameter that is submicron in size.

Embodiment 2 is the aqueous dispersion of embodiment 1, wherein the polyester particles have an average diameter of 200 nm to 900 nm.

Embodiment 3 is the aqueous dispersion of embodiment 1 or embodiment 2, wherein the polyester particles have an average diameter of 200 nm to 700 nm.

Embodiment 4 is the aqueous dispersion of any of embodiments 1 to 3, wherein the polyester particles have an average diameter of 200 nm to 450 nm.

Embodiment 5 is the aqueous dispersion of any of embodiments 1 to 4, wherein the surfactant includes a non-ionic surfactant.

Embodiment 6 is the aqueous dispersion of any of embodiments 1 to 5, wherein the surfactant includes a cationic surfactant.

Embodiment 7 is the aqueous dispersion of any of embodiments 1 to 6, wherein the surfactant includes an anionic surfactant.

Embodiment 8 is the aqueous dispersion of any of embodiments 1 to 7, wherein the at least one ethylenically unsaturated group includes a (meth)acrylate group, a styrene group, a vinyl ester group, or a vinyl ether group.

Embodiment 9 is the aqueous dispersion of any of embodiments 1 to 8, wherein the at least one ethylenically unsaturated group includes a (meth)acrylate group.

Embodiment 10 is the aqueous dispersion of any of embodiments 1 to 8, wherein the at least one ethylenically unsaturated group includes a vinyl ester group or a styrene group.

Embodiment 11 is the aqueous dispersion of any of embodiments 1 to 8, wherein the at least one ethylenically unsaturated group includes a vinyl ether group.

Embodiment 12 is the aqueous dispersion of any of embodiments 1 to 11, including up to 70 weight percent (wt. %) solids, based on the total weight of the aqueous dispersion.

Embodiment 13 is the aqueous dispersion of any of embodiments 1 to 12, wherein the polyester particles are present in an amount of 15 to 45 wt. %, based on the total weight of the aqueous dispersion.

Embodiment 14 is the aqueous dispersion of any of embodiments 1 to 13, wherein the polyester particles are present in an amount of 20 to 40 wt. %, based on the total weight of the aqueous dispersion.

Embodiment 15 is the aqueous dispersion of any of embodiments 1 to 14, wherein the surfactant is present in an amount of 1 to 30 wt. %, based on the total weight of the polyester particles.

Embodiment 16 is the aqueous dispersion of any of embodiments 1 to 15, wherein the surfactant is present in an amount of 1 to 9 wt. %, based on the total weight of the polyester particles.

Embodiment 17 is the aqueous dispersion of any of embodiments 1 to 16, wherein the surfactant is present in an amount of 10 to 30 wt. %, based on the total weight of the polyester particles.

Embodiment 18 is the aqueous dispersion of any of embodiments 1 to 17, wherein the water is present in an amount of 10 to 85 wt. %, based on the total weight of the aqueous dispersion.

Embodiment 19 is the aqueous dispersion of any of embodiments 1 to 18, wherein the water is present in an amount of 60 to 85 wt. %, based on the total weight of the aqueous dispersion.

Embodiment 20 is the aqueous dispersion of any of embodiments 1 to 19, wherein the polyester particles include a polymer having a number average molecular weight of 5 kD or greater.

Embodiment 21 is the aqueous dispersion of any of embodiments 1 to 20, wherein the polyester particles include a polymer having a weight average molecular weight of 50 kD or greater.

Embodiment 22 is the aqueous dispersion of any of embodiments 1 to 21, wherein the polyester particles include at least one of an aliphatic (co)polyester or an aliphatic-aromatic copolyester.

Embodiment 23 is the aqueous dispersion of embodiment 22, wherein the polyester particles include an aliphatic (co)polyester.

Embodiment 24 is the aqueous dispersion of embodiment 22 or embodiment 23, wherein the polyester particles include an aliphatic-aromatic copolyester.

Embodiment 25 is the aqueous dispersion of any of embodiments 1 to 24, wherein the polyester particles include an aliphatic-aromatic copolyester, wherein the aromatic component is selected from the group consisting of terephthalate, isophthalate, and napthalate.

Embodiment 26 is the aqueous dispersion of any of embodiments 1 to 25, wherein the polyester particles include glycol-modified polyethylene terephthalate (PETg).

Embodiment 27 is the aqueous dispersion of any of embodiments 1 to 25, wherein the polyester particles include a copolyester comprising terephthalate, ethylene glycol, and cyclohexyldimethanol, wherein the ethylene glycol and cyclohexyldimethanol are present in a weight ratio range of 70/30 to 10/90 of ethylene glycol to cyclohexyldimethanol.

Embodiment 28 is the aqueous dispersion of any of embodiments 1 to 27, wherein the polyester particles include an acid number of less than 10 mg KOH per gram of the polyester particles.

Embodiment 29 is the aqueous dispersion of any of embodiments 1 to 28, wherein the polyester particles include an acid number of less than 6 mg KOH per gram of the polyester particles.

Embodiment 30 is the aqueous dispersion of any of embodiments 1 to 29, further including at least one ethylenically unsaturated monomer dispersed in the water.

Embodiment 31 is the aqueous dispersion of embodiment 30, wherein the at least one ethylenically unsaturated monomer includes a multifunctional monomer.

Embodiment 32 is the aqueous dispersion of embodiment 30 or embodiment 31, wherein the at least one ethylenically unsaturated monomer is essentially free of any monofunctional monomer.

Embodiment 33 is the aqueous dispersion of any of embodiments 30 to 32, wherein the at least one ethylenically unsaturated monomer includes a water soluble or water dispersible monomer.

Embodiment 34 is the aqueous dispersion of any of embodiments 30 to 33, wherein the at least one ethylenically unsaturated monomer includes a (meth)acrylate, a vinyl ether, a vinyl ester, a styrene, or combinations thereof.

Embodiment 35 is the aqueous dispersion of any of embodiments 30 to 34, wherein the at least one ethylenically unsaturated monomer is present in an amount of 10 to 200 wt. %, based on the total weight of the polyester particles.

Embodiment 36 is the aqueous dispersion of any of embodiments 30 to 35, wherein the at least one ethylenically unsaturated monomer is present in an amount of 20 to 150 wt. %, based on the total weight of the polymer particles.

Embodiment 37 is the aqueous dispersion of any of embodiments 1 to 36, further including 0.1 to 5 wt. % of a photoinitiator, based on the total weight of polymerizable components in the aqueous dispersion.

Embodiment 38 is the aqueous dispersion of any of embodiments 1 to 37, further including 0.001 to 1 wt. % of a polymerization inhibitor, based on the total weight of polymerizable components in the aqueous dispersion.

Embodiment 39 is the aqueous dispersion of any of embodiments 1 to 38, further including 0.001 to 5 wt. % of an optical brightener, based on the total weight of polymerizable components in the aqueous dispersion.

Embodiment 40 is the aqueous dispersion of any of embodiments 1 to 39, further including at least one additive.

Embodiment 41 is the aqueous dispersion of any of embodiments 1 to 40, further including a filler having a submicron average particle size.

Embodiment 42 is the aqueous dispersion of embodiment 41, wherein the filler includes silica, calcite, or both.

Embodiment 43 is the aqueous dispersion of any of embodiments 1 to 41, further including a tackifier.

Embodiment 44 is the aqueous dispersion of any of embodiments 1 to 43, exhibiting a viscosity of 4,000 centipoises (cP) or less, 1,000 cP or less, or 100 cP or less.

Embodiment 45 is the aqueous dispersion of any of embodiments 1 to 44, including a solids content of 5 to 60 wt. %, based on the total weight of the aqueous dispersion.

Embodiment 46 is a coating including a dried layer of the aqueous dispersion.

Embodiment 47 is a coating including a polymerization product of the aqueous dispersion.

Embodiment 48 is an article. The article includes: a substrate, and a polymerization product of the aqueous dispersion disposed on at least a portion of the substrate.

Embodiment 49 is a method of making an aqueous dispersion. The method includes a) dissolving a water-insoluble polyester in a water-immiscible solvent to form a polyester solution; b) combining the polyester solution with an aqueous solution including water and a surfactant; and c) removing at least a portion of the water-immiscible solvent to form the aqueous dispersion including polyester particles dispersed in the water. The surfactant has at least one ethylenically unsaturated group. The water-insoluble polyester has a weight average molecular weight of 20 kD or greater.

Embodiment 50 is the method of embodiment 49, wherein the combining includes mixing the polyester solution and the aqueous solution under high shear conditions.

Embodiment 51 is the method of embodiment 49 or embodiment 50, wherein the removing includes evaporating at least a portion of the water-immiscible solvent.

Embodiment 52 is the method of embodiment 51, wherein the evaporating includes evaporation at ambient temperature.

Embodiment 53 is the method of embodiment 51 or embodiment 52, wherein the evaporating includes evaporation at elevated temperature.

Embodiment 54 is the method of any of embodiments 49 to 53, wherein the water-immiscible solvent includes chloroform.

Embodiment 55 is the method of any of embodiments 49 to 54, wherein the polyester particles have an average diameter of 200 nm to 900 nm.

Embodiment 56 is the method of any of embodiments 49 to 55, wherein the polyester particles have an average diameter of 200 nm to 700 nm.

Embodiment 57 is the method of any of embodiments 49 to 56, wherein the polyester particles have an average diameter of 200 nm to 450 nm.

Embodiment 58 is the method of any of embodiments 49 to 57, wherein the surfactant includes a non-ionic surfactant.

Embodiment 59 is the method of any of embodiments 49 to 58, wherein the surfactant includes a cationic surfactant.

Embodiment 60 is the method of any of embodiments 49 to 58, wherein the surfactant includes an anionic surfactant.

Embodiment 61 is the method of any of embodiments 49 to 60, wherein the at least one ethylenically unsaturated group includes a (meth)acrylate group, a styrene group, a vinyl ether group, or a vinyl ester group.

Embodiment 62 is the method of any of embodiments 49 to 61, wherein the at least one ethylenically unsaturated group includes a (meth)acrylate group.

Embodiment 63 is the method of any of embodiments 49 to 61, wherein the at least one ethylenically unsaturated group includes a vinyl ester group or a styrene group.

Embodiment 64 is the method of any of embodiments 49 to 61, wherein the at least one ethylenically unsaturated group includes a vinyl ether group.

Embodiment 65 is the method of any of embodiments 49 to 64, including up to 60 weight percent (wt. %) solids, based on the total weight of the aqueous dispersion.

Embodiment 66 is the method of any of embodiments 49 to 65, wherein the polyester particles are present in an amount of 15 to 45 wt. %, based on the total weight of the aqueous dispersion.

Embodiment 67 is the method of any of embodiments 49 to 66, wherein the polyester particles are present in an amount of 20 to 40 wt. %, based on the total weight of the aqueous dispersion.

Embodiment 68 is the method of any of embodiments 49 to 67, wherein the surfactant is present in an amount of 1 to 20 wt. %, based on the total weight of the polyester particles.

Embodiment 69 is the method of any of embodiments 49 to 68, wherein the surfactant is present in an amount of 1 to 9 wt. %, based on the total weight of the polyester particles.

Embodiment 70 is the method of any of embodiments 49 to 69, wherein the surfactant is present in an amount of 10 to 20 wt. %, based on the total weight of the polyester particles.

Embodiment 71 is the method of any of embodiments 49 to 70, wherein the water is present in an amount of 10 to 85 wt. %, based on the total weight of the aqueous dispersion.

Embodiment 72 is the method of any of embodiments 49 to 71, wherein the water is present in an amount of 60 to 85 wt. %, based on the total weight of the aqueous dispersion.

Embodiment 73 is the method of any of embodiments 49 to 72, wherein the polyester particles include a polymer having a number average molecular weight of 5 kD or greater.

Embodiment 74 is the method of any of embodiments 49 to 73, wherein the polyester particles include a polymer having a weight average molecular weight of 50 kD or greater.

Embodiment 75 is the method of any of embodiments 49 to 74, wherein the polyester particles include at least one of an aliphatic (co)polyester or an aliphatic-aromatic copolyester.

Embodiment 76 is the method of embodiment 75, wherein the polyester particles include an aliphatic (co)polyester.

Embodiment 77 is the method of embodiment 75 or embodiment 76, wherein the polyester particles include an aliphatic-aromatic copolyester.

Embodiment 78 is the method of any of embodiments 49 to 77, wherein the polyester particles include an aliphatic-aromatic copolyester, wherein the aromatic component is selected from the group consisting of terephthalate, isophthalate, and napthalate.

Embodiment 79 is the method of any of embodiments 49 to 78, wherein the polyester particles include glycol-modified polyethylene terephthalate (PETg).

Embodiment 80 is the method of any of embodiments 49 to 78, wherein the polyester particles include a copolyester comprising terephthalate, ethylene glycol, and cyclohexyldimethanol, wherein the ethylene glycol and cyclohexyldimethanol are present in a weight ratio range of 70/30 to 10/90 of ethylene glycol to cyclohexyldimethanol.

Embodiment 81 is the method of any of embodiments 49 to 80, wherein the polyester particles include an acid number of less than 10 mg KOH per gram of the polyester particles.

Embodiment 82 is the method of any of embodiments 49 to 81, wherein the polyester particles include an acid number of less than 6 mg KOH per gram of the polyester particles.

Embodiment 83 is the method of any of embodiments 49 to 82, further including at least one ethylenically unsaturated monomer dispersed in the water.

Embodiment 84 is the method of embodiment 83, wherein the at least one ethylenically unsaturated monomer includes a multifunctional monomer.

Embodiment 85 is the method of embodiment 83 or embodiment 84, wherein the at least one ethylenically unsaturated monomer is essentially free of any monofunctional monomer.

Embodiment 86 is the method of any of embodiments 83 to 85, wherein the at least one ethylenically unsaturated monomer includes a water soluble or water dispersible monomer.

Embodiment 87 is the method of any of embodiments 83 to 86, wherein the at least one ethylenically unsaturated monomer includes a (meth)acrylate, a vinyl ether, a vinyl ester, a styrene, or combinations thereof.

Embodiment 88 is the method of any of embodiments 83 to 87, wherein the at least one ethylenically unsaturated monomer is present in an amount of 5 to 200 wt. %, based on the total weight of the polyester particles.

Embodiment 89 is the method of any of embodiments 83 to 88, wherein the at least one ethylenically unsaturated monomer is present in an amount of 10 to 150 wt. %, based on the total weight of the polymer particles.

Embodiment 90 is the method of any of embodiments 49 to 89, further including 0.1 to 5 wt. % of a photoinitiator, based on the total weight of polymerizable components in the aqueous dispersion.

Embodiment 91 is the method of any of embodiments 49 to 90, further including 0.001 to 1 wt. % of a polymerization inhibitor, based on the total weight of polymerizable components the aqueous dispersion.

Embodiment 92 is the method of any of embodiments 49 to 91, further including 0.001 to 5 wt. % of an optical brightener, based on the total weight of polymerizable components the aqueous dispersion.

Embodiment 93 is the method of any of embodiments 49 to 92, further including at least one additive.

Embodiment 94 is the method of any of embodiments 49 to 93, further including a filler having a submicron average particle size.

Embodiment 95 is the method of claim 94, wherein the filler includes silica, calcite, or both.

Embodiment 96 is the method of any of embodiments 49 to 95, further including a tackifier.

Embodiment 97 is the method of any of embodiments 49 to 96, exhibiting a viscosity of 4,000 centipoises (cP) or less, 1,000 cP or less, or 100 cP or less.

Embodiment 98 is the method of any of embodiments 49 to 97, including a solids content of 5 to 40 wt. %, based on the total weight of the aqueous dispersion.

Embodiment 99 is photopolymerizable composition. The photopolymerizable composition includes a) water; b) a surfactant; c) polyester particles dispersed in the water; d) a photoinitiator; e) at least one ethylenically unsaturated monomer dispersed in the water; and f) an optional polymerization inhibitor. The polyester particles include a water-insoluble polyester having a weight average molecular weight of 20 kiloDaltons or greater, and the polyester particles have an average diameter that is submicron in size.

Embodiment 100 is the photopolymerizable composition of embodiment 99, further including an optical brightener.

Embodiment 101 is the photopolymerizable composition of embodiment 99 or embodiment 100, wherein the polyester particles have an average diameter of 200 nm to 900 nm.

Embodiment 102 is the photopolymerizable composition of any of embodiments 99 to 101, wherein the polyester particles have an average diameter of 200 nm to 700 nm.

Embodiment 103 is the photopolymerizable composition of any of embodiments 99 to 102, wherein the polyester particles have an average diameter of 200 nm to 450 nm.

Embodiment 104 is the photopolymerizable composition of any of embodiments 99 to 103, wherein the surfactant includes an ionic surfactant.

Embodiment 105 is the photopolymerizable composition of any of embodiments 99 to 104, wherein the surfactant includes a cationic surfactant.

Embodiment 106 is the photopolymerizable composition of any of embodiments 99 to 105, wherein the surfactant includes an anionic surfactant.

Embodiment 107 is the photopolymerizable composition of any of embodiments 99 to 106, wherein the surfactant includes at least one ethylenically unsaturated group.

Embodiment 108 is the photopolymerizable composition of embodiment 107, wherein the at least one ethylenically unsaturated group includes a (meth)acrylate group, a styrene group, a vinyl ether group, or a vinyl ester group.

Embodiment 109 is the photopolymerizable composition of embodiments 107 or 108, wherein the at least one ethylenically unsaturated group includes a (meth)acrylate group.

Embodiment 110 is the photopolymerizable composition of any of embodiments 107 to 109, wherein the at least one ethylenically unsaturated group includes a vinyl ester group or a styrene group.

Embodiment 111 is the photopolymerizable composition of any of embodiments 107 to 110, wherein the at least one ethylenically unsaturated group includes a vinyl ether group.

Embodiment 112 is the photopolymerizable composition of any of embodiments 99 to 111, including up to 60 wt. % solids, based on the total weight of the aqueous dispersion.

Embodiment 113 is the photopolymerizable composition of any of embodiments 99 to 112, wherein the polyester particles are present in an amount of 15 to 45 wt. %, based on the total weight of the aqueous dispersion.

Embodiment 114 is the photopolymerizable composition of any of embodiments 99 to 113, wherein the polyester particles are present in an amount of 20 to 40 wt. %, based on the total weight of the aqueous dispersion.

Embodiment 115 is the photopolymerizable composition of any of embodiments 99 to 114, wherein the surfactant is present in an amount of 1 to 30 wt. %, based on the total weight of the polyester particles.

Embodiment 116 is the photopolymerizable composition of any of embodiments 99 to 115, wherein the surfactant is present in an amount of 1 to 9 wt. %, based on the total weight of the polyester particles.

Embodiment 117 is the photopolymerizable composition of any of embodiments 99 to 116, wherein the surfactant is present in an amount of 10 to 30 wt. %, based on the total weight of the polyester particles.

Embodiment 118 is the photopolymerizable composition of any of embodiments 99 to 117, wherein the water is present in an amount of 10 to 85 wt. %, based on the total weight of the aqueous dispersion.

Embodiment 119 is the photopolymerizable composition of any of embodiments 99 to 118, wherein the water is present in an amount of 60 to 85 wt. %, based on the total weight of the aqueous dispersion.

Embodiment 120 is the photopolymerizable composition of any of embodiments 99 to 119, wherein the polyester particles include a polymer having a number average molecular weight of 5 kD or greater.

Embodiment 121 is the photopolymerizable composition of any of embodiments 99 to 120, wherein the polyester particles include a polymer having a weight average molecular weight of 50 kD or greater.

Embodiment 122 is the photopolymerizable composition of any of embodiments 99 to 121, wherein the polyester particles include at least one of an aliphatic (co)polyester or an aliphatic-aromatic copolyester.

Embodiment 123 is the photopolymerizable composition of embodiment 122, wherein the polyester particles include an aliphatic (co)polyester.

Embodiment 124 is the photopolymerizable composition of embodiment 122 or embodiment 123, wherein the polyester particles include an aliphatic-aromatic copolyester.

Embodiment 125 is the photopolymerizable composition of any of embodiments 99 to 124, wherein the polyester particles include an aliphatic-aromatic copolyester, wherein the aromatic component is selected from the group consisting of terephthalate, isophthalate, and napthalate.

Embodiment 126 is the photopolymerizable composition of any of embodiments 99 to 125, wherein the polyester particles include glycol-modified polyethylene terephthalate (PETg).

Embodiment 127 is the photopolymerizable composition of any of embodiments 99 to 126, wherein the polyester particles include a copolyester comprising terephthalate, ethylene glycol, and cyclohexyldimethanol, wherein the ethylene glycol and cyclohexyldimethanol are present in a weight ratio range of 70/30 to 10/90 of ethylene glycol to cyclohexyldimethanol.

Embodiment 128 is the photopolymerizable composition of any of embodiments 99 to 127, wherein the polyester particles include an acid number of less than 10 mg KOH per gram of the polyester particles.

Embodiment 129 is the photopolymerizable composition of any of embodiments 99 to 128, wherein the polyester particles include an acid number of less than 6 mg KOH per gram of the polyester particles.

Embodiment 130 is the photopolymerizable composition of any of embodiments 99 to 129, further including 0.1 to 5 wt. % of a photoinitiator, based on the total weight of the aqueous dispersion.

Embodiment 131 is the photopolymerizable composition of any of embodiments 99 to 130, further including 0.001 to 1 wt. % of a polymerization inhibitor, based on the total weight of the aqueous dispersion.

Embodiment 132 is the photopolymerizable composition of any of embodiments 99 to 131, further including 0.001 to 5 wt. % of an optical brightener, based on the total weight of the aqueous dispersion.

Embodiment 133 is the photopolymerizable composition of any of embodiments 99 to 132, wherein the at least one ethylenically unsaturated monomer includes a multifunctional monomer.

Embodiment 134 is the photopolymerizable composition of any of embodiments 99 to 133, wherein the at least one ethylenically unsaturated monomer is essentially free of any monofunctional monomer.

Embodiment 135 is the photopolymerizable composition of any of embodiments 99 to 134, wherein the at least one ethylenically unsaturated monomer includes a water soluble or water dispersible monomer.

Embodiment 136 is the photopolymerizable composition of any of embodiments 99 to 135, wherein the at least one ethylenically unsaturated monomer includes a (meth)acrylate, a vinyl ether, a vinyl ester, a styrene, or combinations thereof.

Embodiment 137 is the photopolymerizable composition of any of embodiments 99 to 136, wherein the at least one ethylenically unsaturated monomer is present in an amount of 70 to 170 wt. %, based on the total weight of the polyester particles.

Embodiment 138 is the photopolymerizable composition of any of embodiments 99 to 136, wherein the at least one ethylenically unsaturated monomer is present in an amount of 10 to 70 wt. %, based on the total weight of the polyester particles.

Embodiment 139 is the photopolymerizable composition of any of embodiments 99 to 136 or embodiment 138, wherein the at least one ethylenically unsaturated monomer is present in an amount of 20 to 25 wt. %, based on the total weight of the polymer particles.

Embodiment 140 is the photopolymerizable composition of any of embodiments 99 to 139, further including at least one additive.

Embodiment 141 is the photopolymerizable composition of any of embodiments 99 to 140, further including a filler having a submicron average particle size.

Embodiment 142 is the photopolymerizable composition of embodiment 140, wherein the filler includes silica, calcite, or both.

Embodiment 143 is the photopolymerizable composition of any of embodiments 99 to 142, further including a tackifier.

Embodiment 144 is the photopolymerizable composition of any of embodiments 99 to 143, including a solids content of 5 to 40 wt. %, based on the total weight of the aqueous dispersion.

Embodiment 145 is an article. The article includes a polymerized reaction product of the photopolymerizable composition of any of embodiments 99 to 144.

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Mo., or may be synthesized by known methods. Table 1 (below) lists materials used in the examples and their sources.

TABLE 1

Materials List

| DESIGNATION | DESCRIPTION | USE | SOURCE |
| --- | --- | --- | --- |
| TA | Terephthalic acid | Diacid | Indorama Corporation, Singapore |
| EG | Ethylene glycol | Diol | ME Global, Midland, MI |
| CHDM | Cyclohexyl dimethanol | Diol | Eastman Chemical Company, Kingsport, TN, USA |
| P-PETg | Copolyester sheet obtained under the trade designation PACUR PET-G | Polyester | Pacur, LLC, Oshkosh, WI, USA |
| E-6763 | Copolyester obtained under the trade designation EASTAR 6763 | Polyester | Eastman Chemical Company |
| VM-317 PCTg | Copolyester obtained under the trade designation VISUALIZE VM 317 PCT-G | Polyester | Eastman Chemical Company |
| D-PETg Films | Glycol modified polyethylene terephthalate hydrophobic thermoplastic polymer film obtained under the trade designation DURAN PET-G | Polyester | Scheu Dental Technology, Iserlohn, Germany |
| HAR-2020 | Polyoxyethylene styrenated phenyl ether ammonium sulfate obtained under the trade designation HITENOL AR-2020 | Surfactant | Dai-ichi Kogyo Seiyaku, Kyoto, Japan |
| SR344 | Polyethylene glycol (400) diacrylate obtained under the trade designation SR344 | Monomer | Sartomer, Exton, PA, USA |
| SR415 | Ethoxylated(20) trimethylolpropane triacrylate obtained under the trade designation SR415 | Monomer | Sartomer |
| TPO | Diphenyl(2,4,6-trimethylbenzoyl)phosphine oxide | Photoinitiator | BASF, Ludwigshafen, Germany |
| BHT | Butylated hydroxytoluene | Radical Inhibitor | Sigma-Aldrich, St. Louis, MO, USA |

TABLE 1-continued

Materials List

| DESIGNATION | DESCRIPTION | USE | SOURCE |
|---|---|---|---|
| TOB | 2,5-thiophenediylbis(5-tert-butyl-1,3-benzoxazole) obtained under the trade designation TINOPAL OB | Optical Brightener | BASF |
| 2-(2-ethyoxyethoxy)ethanol | 2-(2-ethyoxyethoxy)ethanol | Extraction Solvent | Sigma-Aldrich |

Test Methods
Polymer Molecular Weight and Polydispersity (PDI) Determination

The molecular weight was characterized using gel permeation chromatography (GPC). The GPC equipment consisted of an HPLC 1100 Series (comprised of binary pump, degasser, autosampler, column compartment, differential refractive index detector) from Agilent Technologies (Santa Clara, Calif., USA) operated at a flow rate of 1 milliliter/minute using chloroform (OMNISOLV grade, from EMD Millipore Corporation) as eluent. The GPC column was a JORDI GEL DVB Mixed Bed (250 mm length×10 mm internal diameter) from Jordi Labs, LLC (Mansfield, Mass., USA). The column compartment and differential refractive index detector were set to 40° C. The data were analyzed using Agilent GPC/SEC software from Agilent Technologies.

The sample was prepared in duplicate and each duplicate was injected singly. A solution of approximate concentration 3 milligrams/milliliter was prepared in a glass scintillation vial using chloroform (OMNISOLV grade) as solvent. The vial was swirled on an Advanced Digital Shaker from VWR (Radnor, Pa., USA) for at least 4 hours in order to allow dissolution. The sample solution was filtered through a 0.45 micrometer PTFE syringe filter (Fisher Scientific, Hampton, N.H., USA) and placed into an autosampler vial that was tightly crimped. This solution was placed into the autosampler of the GPC system for analysis. The injection volume was set to 50 microliters.

The molecular weight standards were EASICAL Polystyrene from Agilent Technologies (Batch Number 0006308830. The Mp (peak molecular weight) values of the polystyrene molecular weight standards used in the calibration curve ranged from 580 grams/mole to 2,698.00 grams/mole. The relative molecular weight of the polymer samples to polystyrene standards was reported.

Solids Percent Measurement Test Method

The percent solids in the aqueous dispersions were determined gravimetrically. Specifically, the mass of an empty aluminum tray, $m_0$, was first measured. Then, a few drops of the aqueous polymer dispersions were added the to the aluminum tray, and total mass of the aluminum tray and the polymer dispersion, $m_{wet}$, was recorded. The sample tray was subsequently placed in a convection oven set at 110° C. for 60 minutes to evaporate off the solvent. The total mass of the aluminum tray and the dried polymer, $m_{dry}$, was finally recorded. The percent solids in the polymer dispersion was calculated using the following equation:

$$\text{percent solids} = \frac{m_{dry} - m_0}{m_{wet} - m_0}$$

Preparation of Glycol Modified Poly(Ethylene Terephthalate): Preparative and Comparative Examples For PE-1, to a clean, dry oil jacketed 100 gallon stainless steel reactor, 56.7 kilograms (kg) TA, 4.2 kg EG, and 39.4 kg CHDM were added. The kettle was placed under 30 pounds per square inch (psi) (206.8 kilopascals) of nitrogen pressure. The contents of the vessel were then heated and a typical PET transesterification took place. The batch was heated to approximately 485° F. (approximately 252° C.). Once esterification was determined complete, pressure in the kettle was slowly vented.

Subsequently, a typical polyester polymerization commenced. Vacuum was slowly pulled on the kettle and heat was applied to remove excess glycol. Eventually, the kettle reached a temperature of 525° F. (274° C.) and a vacuum pressure measuring as low as 1.5 mmHg. Once a target inherent viscosity (IV) of approximately 0.70 deciliters per gram (dL/g) was achieved, as determined by ASTM D4603-18, the batch was pressurized (under nitrogen) and drained into trays. The resultant glycol-modified poly(ethylene terephthalate) was composed of 100 mol % TA (on an acid basis); 20 mol % EG and 80 mol % CHDM (on a diol basis) (calculated from the loading levels and the molecular weight of the feed materials).

Alternative glycol-modified poly(ethylene terephthalate) compositions (CE-1 to CE-3, PE-2 and PE-3) were prepared using the same process, but with different TA/EG/CHDM ratios (according to Table 2). For each composition, the resulting resin was ground up and utilized for glycol-modified poly(ethylene terephthalate) solution making.

TABLE 2

Compositions of Custom Glycol-Modified Poly(Ethylene Terephthalate)s

| ID | SAMPLE | TA, mol % diacids | EG, mol % diol | CHDM, mol % diol | IV | Solubility in Chloroform (temperature) |
|---|---|---|---|---|---|---|
| A1 | CE-1 | 100 | 95 | 5 | 0.661 | No (60° C.) |
| A2 | CE-2 | 100 | 90 | 10 | 0.652 | No (60° C.) |
| A3 | CE-3 | 100 | 85 | 15 | 0.658 | No (60° C.) |
| A4 | PE-1 | 100 | 20 | 80 | 0.696 | Yes (60° C.) |
| A5 | PE-2 | 100 | 15 | 85 | 0.712 | Yes (60° C.) |
| A6 | PE-3 | 100 | 10 | 90 | 0.681 | Yes (60° C.) |

Additional glycol-modified poly(ethylene terephthalate) compositions (PE-4 to PE-6) were purchased from vendors (as listed in Table 1). The compositions of the commercial glycol modified poly(ethylene terephthalate)s were confirmed using $^1$H NMR according to Chen and Zhang et al. (RSC Adv., 2015 5, 60570). Composition information identified for the purchased glycol modified poly(ethylene terephthalate)s can be found in Table 3.

TABLE 3

Commercial Glycol-Modified Poly(Ethylene Terephthalate)s

| SAMPLE | TA, mol % diacids | EG, mol % diol | CHDM, mol % diol | Solubility in Chloroform (temperature) | $M_n$, KDa | $M_w$, KDa | PDI |
|---|---|---|---|---|---|---|---|
| PE-4 (E-6763) | ~100 | ~70 | ~30 | Yes (60° C.) | nd | nd | nd |
| PE-5 (P-PETg) | ~100 | ~70 | ~30 | Yes (RT) | 10.7 | 61.1 | 5.73 |
| PE-6 (VM-317 PCTg) | ~100 | ~30 | ~70 | Yes (40° C.) | nd | nd | nd |

~= approximately,
"nd" = not determined

Preparation of Glycol-Modified Poly(Ethylene Terephthalate) Aqueous Dispersion: Examples 1A to 1G (EX-1A to EX-1G)

For Examples 1A to 1G, the PACUR PETg (P-PETg) film samples (number average molecular weight ($M_n$) 10.7 kDa, weight average molecular weight ($M_w$) 61.1 kDa, PDI 5.73) were first dissolved in chloroform at 5 wt. % solid concentration. The 5 wt. % PETg chloroform solution (100 g) was then slowly added to a surfactant solution (100 g, selected according to Table 4), where the surfactant amounts were adjusted to the polymer loadings according to Table 4) in a 32 ounce glass jar under high shear (e.g., 15000 revolutions per minute (rpm) with a rotor-stator mixer) for 30 minutes. The resulting PETg aqueous dispersion was concentrated using rotary evaporation to remove chloroform and to further concentrate the PETg dispersion to higher concentration (e.g., 21.8 to 40.6% solids, according to Table 4).

Alternative glycol-modified poly(ethylene terephthalate) aqueous dispersions were prepared the same except for varying amounts of surfactant to polymer ratios. Depending on the polyester choice, the polyester chloroform solutions may be prepared at temperatures up to 75° C. over time.

TABLE 4

Examples of Aqueous Dispersion of Glycol-Modified Poly(Ethylene Terephthalate)s

| EXAMPLE | SURFACTANT (% SURFACTANT TO PETg) | PETg (% PETg FINAL) | AVERAGE SOLID SIZE ($D_{avg}$), nm | STABILITY |
|---|---|---|---|---|
| EX-1A | HAR-2020 (28.6) | PE-5 (23.5) | 265 | >72 hours |
| EX-1B | HAR-2020 (28.6) | PE-5 (40.6) | 265 | >72 hours |
| EX-1B | HAR-2020 (16.7) | PE-5 (26.3) | 225 | >72 hours |
| EX-1C | HAR-2020 (9.1) | PE-5 (21.8) | 374 | >72 hours |
| EX-1D | HAR-2020 (4.8) | PE-5 (36.3) | 668 | Partially settled in 72 hours |
| EX-1E | HAR-2020 (7.4) | PE-5 (40.4) | 412 | >72 hours |
| EX-1F | HAR-2020 (8.0) | PE-3 (3.8) | 406 | >72 hours |
| EX-1G | HAR-2020 (8.0) | PE-4 (5.3) | 407 | >72 hours |

Preparation of Coatings with Glycol-Modified Poly(Ethylene Terephthalate) Aqueous Dispersions EX-1E was coated with a 12 mil (0.3 mm) gap onto aluminum foil. The polymer coating was placed into an oven set at 95° C. for 30 minutes and subsequently annealed at 120° C. for 30 minutes, yielding a translucent coating.

Preparation of Curable Resin

A typical curable resin (i.e., photopolymerizable) composition comprises aqueous dispersible multifunctional (meth) acrylate SR-415 (Sartomer), SR-344 (Sartomer), TPO (Lucirin), BHT and Tinopal OB (BASF). The curable compositions were roller-mixed prior to further formulation.

TABLE 5

Curable acrylic resin formulation (PEG-acrylate)

| MATERIAL | EX-2A | EX-2B | EX-2C | EX-2D |
|---|---|---|---|---|
| SR344, g | 33.5 | | | |
| SR415, g | 38.8 | 10 | 10 | 10 |
| TPO, g | 0.18 | 0.1 | 0.05 | 0.05 |
| BHT, g | 0.07 | | 0.15 | |
| OB, g | 0.07 | | | 0.15 |

Preparation of Curable Aqueous Polymer Dispersion

The curable aqueous polymer dispersion (i.e., photopolymerizable composition) was prepared by mixing selected amounts of the polymer dispersion (e.g. EX-1A) and curable resin (e.g. EX-2A) in a vial using a pipet. The formulated aqueous polymer dispersions were sandwiched between two glass slides with a 3 mil (0.08 mm) silicon rubber shim. The silicon rubber shim has a 1 mm diameter opening in its center. The sample specimens were exposed to 450 nm blue light using a 3M ESPE ELIPAR DEEPCURE-S source (Maplewood, Minn., USA) for varying amounts of time, as indicated in Table 6 below. After the 450 nm light exposure, the fluidity of the curable polymer dispersion was recorded. If the dispersion would flow off the spot without leaving a residue, it was considered "Not Cured"; if a fraction of the dispersion would flow off the spot, leaving a solid spot, it was considered "Partially Cured"; if the entirety of the exposed dispersion appeared gelled, it was recorded as "Fully Cured". Results are shown in Table 6.

TABLE 6

Curable Aqueous Polymer Dispersions and the Curing Screening Results

| EXAMPLE | PETg DISPERSION, g | PEG-ACRYLATE, g | Wt. % of PEG-ACRYLATE TO PETg | EXPOSURE TIME TESTED AND SAMPLE NOT CURED | EXPOSURE TIME TO CURING |
|---|---|---|---|---|---|
| EX-3 | EX-1A, 2 | EX-2A, 0.8 | 170 | 10, 20, and 30 seconds | 40 seconds (Fully Cured) |
| EX-4 | EX-1A, 2 | EX-2A, 0.6 | 128 | 10, 20, 30, and 40 seconds | 60 seconds (Partially Cured); 90 seconds (Fully Cured) |
| EX-5 | EX-1A, 2 | EX-2A, 0.4 | 85 | 60, 90, and 120 seconds | Not Cured |
| EX-6 | EX-1B, 2 | EX-2A, 0.8 | 100 | 10 and 20 seconds | 30 seconds (Fully Cured) |
| EX-7 | EX-1B, 2 | EX-2A, 0.4 | 50 | 30, 40, 60, 90, and 120 seconds | Not Cured |
| EX-8 | EX-1B, 2 | EX-2A, 0.6 | 75 | 20 and 30 seconds | 40 seconds (Partially Cured); 60 seconds (Fully Cured) |

Super Critical $CO_2$ Extraction of Photo-Cured Specimens

Curable PETg dispersion EX-3 was irradiated in a plastic re-sealable zipper storage bag to avoid moisture evaporation during the photo-curing process. The bulk sample was cured inside a Proto Cure 3D Printer Copact Post-Curing Device (Product No. 03-01-00-00; Proto Products, Fairview, Tenn., USA) in 30 minutes, and the cured specimen was extracted with fresh 2-(2-ethyoxyethoxy)ethanol every 24 hours for a total of 72 hours. The solvent extracted specimen (0.24 grams (g)) was subsequently extracted using supercritical $CO_2$ at 2400 pounds per square inch (psi) and 39° C. For EX-3, the aerogel weighed 0.0861 g (63% mass loss).

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

The invention claimed is:

1. An aqueous dispersion comprising:
   a) water;
   b) a surfactant, wherein the surfactant comprises at least one ethylenically unsaturated group; and
   c) polyester particles dispersed in the water, wherein the polyester particles comprise a water-insoluble polyester having a weight average molecular weight of 20 kiloDaltons (kD) or greater, and wherein the polyester particles have an average diameter that is submicron in size.

2. The aqueous dispersion of claim 1, wherein the polyester particles have an average diameter of 200 nm to 700 nm.

3. The aqueous dispersion of claim 1, wherein the at least one ethylenically unsaturated group comprises a (meth)acrylate group, a styrene group, a vinyl ether group, or a vinyl ester group.

4. The aqueous dispersion of claim 1, wherein the polyester particles are present in an amount of 15 to 45 wt. %, based on the total weight of the aqueous dispersion.

5. The aqueous dispersion of claim 1, wherein the polyester particles comprise a polymer having a number average molecular weight of 5 kD or greater.

6. The aqueous dispersion of claim 1, wherein the polyester particles comprise at least one of an aliphatic (co)polyester or an aliphatic-aromatic copolyester.

7. The aqueous dispersion of claim 1, wherein the polyester particles comprise glycol-modified polyethylene terephthalate (PETg).

8. The aqueous dispersion of claim 1, wherein the polyester particles comprise a copolyester comprising terephthalate, ethylene glycol, and cyclohexyldimethanol, wherein the ethylene glycol and cyclohexyldimethanol are present in a weight ratio range of 70/30 to 10/90 of ethylene glycol to cyclohexyldimethanol.

9. The aqueous dispersion of claim 1, wherein the polyester particles comprise an acid number of less than 10 mg KOH per gram of the polyester particles.

10. The aqueous dispersion of claim 1, further comprising at least one ethylenically unsaturated monomer dispersed in the water.

11. The aqueous dispersion of claim 10, wherein the at least one ethylenically unsaturated monomer is essentially free of any monofunctional monomer.

12. The aqueous dispersion of claim 10, wherein the at least one ethylenically unsaturated monomer comprises a (meth)acrylate, a vinyl ether, a vinyl ester, a styrene, or combinations thereof.

13. The aqueous dispersion claim 10, wherein the at least one ethylenically unsaturated monomer is present in an amount of 10 to 170 wt. %, based on the total weight of the polyester particles.

14. The aqueous dispersion of claim 1, further comprising 0.1 to 5 wt. % of a photoinitiator, based on the total weight of polymerizable components in the aqueous dispersion.

15. A coating comprising a dried layer of the aqueous dispersion of claim 1.

16. An article comprising: a substrate, and a polymerization product of the aqueous dispersion of claim 1 disposed on at least a portion of the substrate.

17. A method of making an aqueous dispersion, the method comprising:
   a) dissolving a water-insoluble polyester having a weight average molecular weight of 20 kD or greater in a water-immiscible solvent to form a polyester solution;
   b) combining the polyester solution with an aqueous solution comprising water and a surfactant, wherein the surfactant comprises at least one ethylenically unsaturated group; and
   c) removing at least a portion of the water-immiscible solvent to form the aqueous dispersion comprising polyester particles dispersed in the water.

18. The method of claim 17, wherein the combining comprises mixing the polyester solution and the aqueous solution under high shear conditions.

19. A photopolymerizable composition comprising:
   a) water;
   b) a surfactant;
   c) polyester particles dispersed in the water, wherein the polyester particles comprise a water-insoluble polyester having a weight average molecular weight of 20 kD or greater and wherein the polyester particles have an average diameter that is submicron in size;
   d) a photoinitiator;
   e) at least one ethylenically unsaturated monomer dispersed in the water; and
   f) an optional polymerization inhibitor.

20. An article comprising a polymerized reaction product of the photopolymerizable composition of claim 19.

\* \* \* \* \*